United States Patent
Sun et al.

(10) Patent No.: US 9,116,990 B2
(45) Date of Patent: Aug. 25, 2015

(54) ENHANCING FRESHNESS OF SEARCH RESULTS

(75) Inventors: Walter Sun, Bellevue, WA (US); Thomas Arthur Ledbetter, Bellevue, WA (US); Vinay Sudhir Deshpande, Bellevue, WA (US); Yinzhe Yu, Bellevue, WA (US); Lin Guo, Redmond, WA (US); Abhishek Singh, Redmond, WA (US); Junaid Ahmed, Redmond, WA (US); Jay Kumar Goyal, Bellevue, WA (US); Jingfeng Li, Issaquah, WA (US); Brahm Kiran Singh, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 631 days.

(21) Appl. No.: 12/789,020

(22) Filed: May 27, 2010

(65) Prior Publication Data

US 2011/0295844 A1    Dec. 1, 2011

(51) Int. Cl.
*G06F 17/30* (2006.01)
*G06Q 10/00* (2012.01)

(52) U.S. Cl.
CPC .... *G06F 17/30864* (2013.01); *G06F 17/30719* (2013.01); *G06Q 10/00* (2013.01)

(58) Field of Classification Search
CPC .......................... G06F 17/30719; G06Q 10/00
USPC ......... 707/706, 713, 722–728, 736, 758, 781, 707/999.003–999.006
See application file for complete search history.

(56) References Cited

U.S. PATENT DOCUMENTS

| | | | |
|---|---|---|---|
| 7,571,106 B2 | 8/2009 | Cao et al. | |
| 8,849,809 B1 * | 9/2014 | Seshadri | 707/725 |
| 2002/0156917 A1 * | 10/2002 | Nye | 709/238 |
| 2004/0064442 A1 * | 4/2004 | Popovitch | 707/3 |

(Continued)

OTHER PUBLICATIONS

Ziming Zhuang and Silviu Cucerzan, Re-Ranking Search Results Using Query Logs, Nov. 5-11, 2006, 2 pages, Copyright is held by the author/owner(s), CIKM'06, Nov. 5-11, 2006, Arlington, Virginia, USA, ACM 1-59593-433-2/06/0011, http://grads.ist.psu.edu/zzhuang/docs/Zhuang_CIKM06.pdf.

(Continued)

*Primary Examiner* — Syling Yen
(74) *Attorney, Agent, or Firm* — Dave Ream; Jim Ross; Micky Minhas

(57) ABSTRACT

Methods, systems, and computer-storage media for improving the freshness, or the apparent freshness, of search results are described. In an embodiment, the first portion of search results presented on a search results page are based on responsiveness to the search query and a second portion of results describe only recently published documents that are responsive to the search query. In an embodiment, a more recent version of the document, which is not directly used to determine responsiveness, is used to build the caption for a search result. Another way to make search results appear fresh is to include a publication time within the search result caption. In one embodiment, the publication time is generated by calculating a point in time between when a document is first added to a search index and the previous time the search engine visited the site where the document was found.

20 Claims, 7 Drawing Sheets

(56) References Cited

U.S. PATENT DOCUMENTS

| | | | |
|---|---|---|---|
| 2005/0071741 A1* | 3/2005 | Acharya et al. | 715/500 |
| 2005/0144193 A1* | 6/2005 | Henzinger | 707/103 R |
| 2007/0094255 A1* | 4/2007 | Acharya et al. | 707/5 |
| 2007/0112730 A1* | 5/2007 | Gulli et al. | 707/3 |
| 2007/0143300 A1* | 6/2007 | Gulli et al. | 707/10 |
| 2008/0077558 A1* | 3/2008 | Lawrence et al. | 707/3 |
| 2008/0114738 A1 | 5/2008 | Chao | |
| 2009/0204575 A1* | 8/2009 | Olston et al. | 707/3 |
| 2010/0332513 A1* | 12/2010 | Azar et al. | 707/769 |
| 2013/0060750 A1* | 3/2013 | Gupta | 707/709 |

OTHER PUBLICATIONS

Dirk Lewandowski, Henry Wahlig and Gunnar Meyer-Bautor, The Freshness of Web Search Engine Databases, Journal of Information Science 2006; 32; 131, DOI: 10.1177/0165551506062326, Published by: SAGE Publications, on behalf of: Chartered Institute of Library and Information Professionals, Received Jul. 19, 2005; Revised Sep. 5, 2005, 19 pages, http://jis.sagepub.com.

How to Use Google Web Search to Get Fresh Content, Retrieved Date: Apr. 16, 2010, 4 pages, http://mashable.blog.co.in/2009/05/11/how-to-use-google-web-search-to-get-fresh-content/.

* cited by examiner

410
- 412 — DEEPWATER HORIZON DRILLING RIG EXPLOSION - ...
- 414 — 4/20/2010 – THE DEEPWATER HORIZON DRILLING RIG EXPLOSION OCCURRED ON APRIL 20, 2010 ON THE SEMI-SUBMERSIBLE OFFSHORE DRILLING RIG DEEPWATER HORIZON IN THE GULF OF MEXICO.
- 416 — EN.WIKIPEDIA.ORG/WIKI/2010_EXPLOSION_ON_DEEPWATER_HORIZON_DRILLING_RIG

420
- 422 — DEEPWATER HORIZON DRILLING RIG EXPLOSION - ...
- 424 — THE DEEPWATER HORIZON, A SEMI-SUBMERSIBLE OFFSHORE DRILLING RIG IN THE GULF OF MEXICO, EXPLODED AFTER A BLOWOUT ON APRIL 20, 2010, AND SANK TWO DAYS LATER, TAKING WITH IT ELEVEN LIVES ...
- 426 — EN.WIKIPEDIA.ORG/WIKI/2010_EXPLOSION_ON_DEEPWATER_HORIZON_DRILLING_RIG

FIG. 4

ENHANCING FRESHNESS OF SEARCH RESULTS

BACKGROUND

Search engines produce a list of search results in response to receiving a query. The search results may describe websites, blogs, blog entries, a microblog, social networking pages, advertisements, and other documents. The search results may be ranked by responsiveness to the query so that the most responsive results are presented at the top of the results page.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention improve the freshness, or the apparent freshness, of search results. The actual freshness of search results is improved by presenting search results describing recently published documents in response to a search query. In one embodiment, the first portion of search results presented on a search results page are based on responsiveness to the search query and a second portion of results describe only recently published documents that are responsive to the search query.

The apparent freshness of search results is improved by using recent versions of the document to form search result captions. A document may be selected for inclusion in a series of search results based on responsiveness to a search query. The responsiveness to the search query may be determined based on information associated with an old version of the document. In one embodiment, a more recent version of the document, which is not directly used to determine responsiveness, is used to build the caption for a search result. Another way to make search results appear fresh is to include a publication time within the search result caption. In one embodiment, the publication time is generated by calculating a point in time between when a document is first added to a search index and the previous time the search engine visited the site where the document was found.

BRIEF DESCRIPTION OF THE DRAWINGS

Embodiments of the invention are described in detail below with reference to the attached drawing figures, wherein:

FIG. 4 is a diagram of a search result generated using a recent version of a document that is determined to be responsive to a search query based on a old version of the document, in accordance with an embodiment of the present invention;

DETAILED DESCRIPTION

Figure 1:
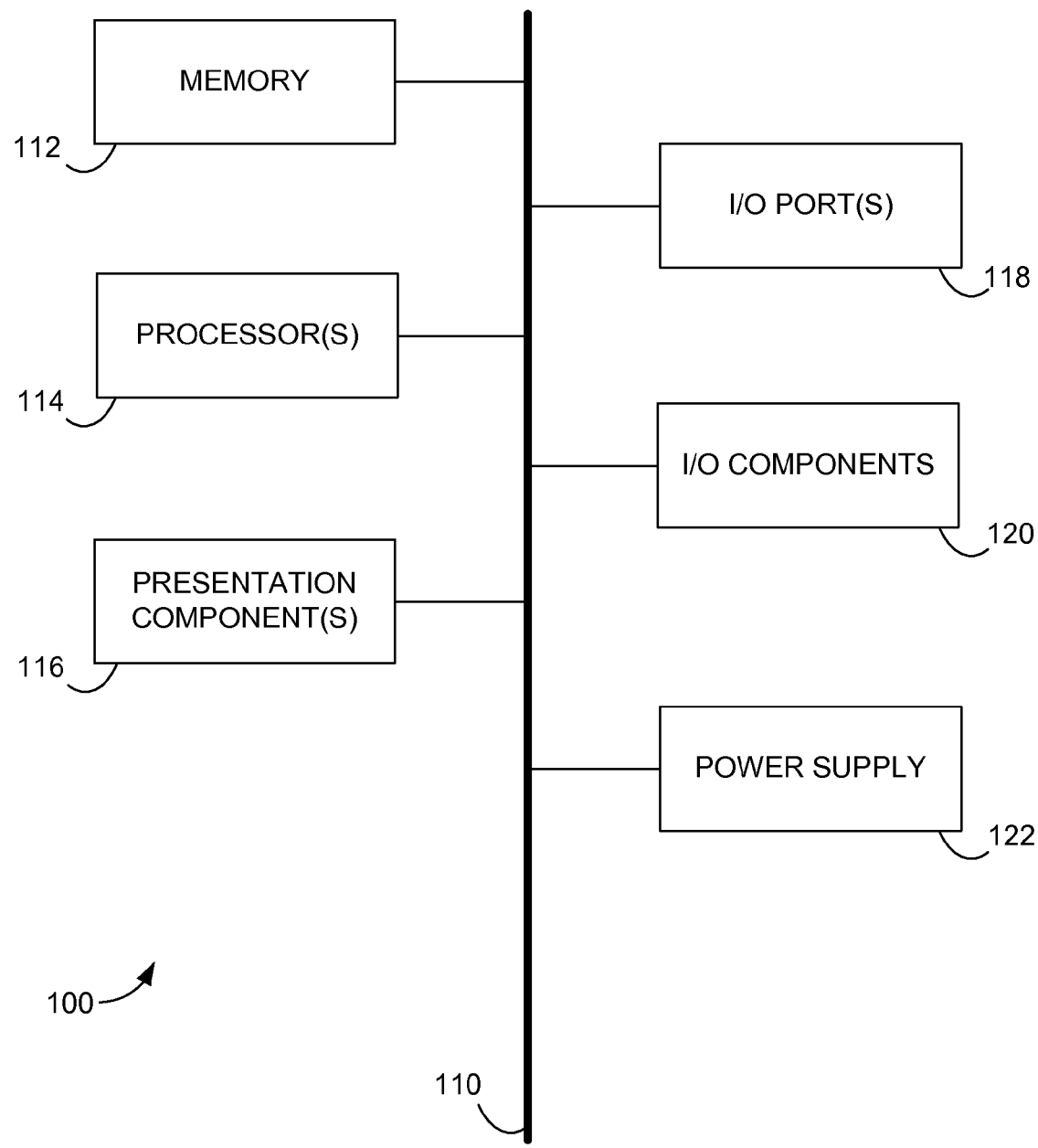
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention improve the freshness, or the apparent freshness, of search results. The actual freshness of search results is improved by presenting a portion of fresh search results that describe recently published documents when the user's search query suggests that the user may be interested in viewing recent documents. In one embodiment, the first portion of search results presented on a search results page is based on responsiveness to the search query and a second portion of results describe only recently published documents that are responsive to the search query.

The apparent freshness of search results is improved by using recent versions of the document to form search result captions. A document may be selected for inclusion in a series of search results based on responsiveness to a search query. The responsiveness to the search query may be determined based on information associated with an old version of the document. In one embodiment, a more recent version of the document, which is not directly used to determine responsiveness, is used to build the caption for a search result. Another way to make search results appear fresh is to include a publication time within the search result caption. In one embodiment, the publication time is generated by calculating a point in time between when a document is first added to a search index and the previous time the search engine visited the site where the document was found.

In one embodiment, one or more computer-storage media having computer-executable instructions embodied thereon for performing a method of featuring recently published documents within search results. The method includes receiving a search query from a user and calculating a freshness score for the search query, wherein the freshness score is based on how many recently published documents are responsive to the search query. The method also includes determining that the freshness score falls into a designated range bounded by a low-threshold score and a high-threshold score. The method also includes displaying, on a search results page, a first plurality of search results that are selected for inclusion in the first plurality based on overall responsiveness to the search query. The method also includes, upon said determining, displaying, on the search results page, a second plurality of search results that describe documents published less than a designated period of time ago.

In another embodiment, a method of including recent document changes in search result captions. The method includes receiving a search query. The method also includes indentifying a plurality of documents that are responsive to the search query from a main index that is updated within a first time interval. The method also includes determining that a document within the plurality of documents is also indexed in a fresh index that is updated within a second time interval. The second time interval is shorter than the first time interval, thereby populating the fresh index with newer versions of documents. The method also includes generating a search result caption that describes the document using content from the document's index entry within the fresh index. The method also includes displaying the search result caption in a group of search results describing the plurality of documents.

In another embodiment, one or more computer-storage media having computer-executable instructions embodied thereon for performing a method of calculating a publication time for a document. The method includes visiting an online location at a first point in time. The method also includes analyzing a content available at the online location at the first point in time and visiting the online location at a second point in time. The method includes indexing a particular document that was available at the second point in time, but not the first point in time and calculating the publication time for the particular document by adding half a difference in time between the first point in time and the second point in time to the first point in time.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
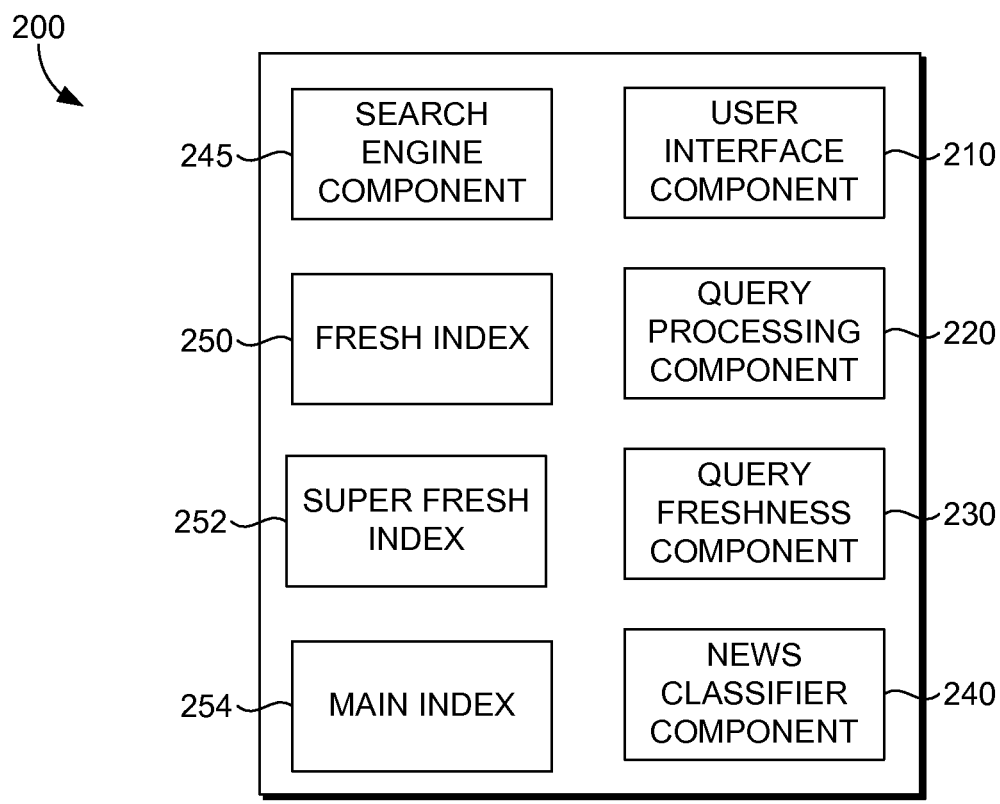
FIG. 2 is a diagram of an illustrative operating environment suitable for implementing embodiments of the invention.

Turning now to FIG. 2, an illustrative computing system architecture 200 for use with embodiments of the present invention is shown. The computing system architecture 200 shown in FIG. 2 is an example of one suitable computing system architecture 200. The computing system architecture 200 runs on one or more computing devices similar to the computing device 100 described with reference to FIG. 1. The computing system architecture 200 should not be interpreted as having any dependency or requirement related to any single module/component or combination of modules/components illustrated therein. The computing system architecture 200 includes a user interface component 210, a query-processing component 220, a query-freshness component 230, a news-classifier component 240, a search engine component 245, a fresh index 250, a super-fresh index 252, and a main index 254.

The user interface component 210 generates a user interface that may be displayed on a user's computing device. Examples of computing devices include a laptop computer, a monitor, a PDA, a Smartphone, a tablet PC, an electronic book, and other similar devices. The user interface component 210 may generate a search page that receives a search query from a user and displays a search results page in return. The search results page may also include advertisements, images, and other information. In one embodiment, the user interface generated by the user interface component 210 is displayed as a web page over the Internet. The user interface component 210 may communicate the search query to query-processing component 220 and receive search results in return. A search query may include text, letters, numbers, words, phrases, sentences, Boolean operators, characters, and other items.

The query-processing component 220 receives a search query from the user interface component 210 and identifies one or more documents that are responsive to the search query. As used throughout this application, a document may be a web page, a blog entry, a microblog entry, an image, a video, a word processing document, a spreadsheet, a book, a PDF document, and any other items available on the Internet. A document is in an electronic form and may be associated with a URL. In general, a document is responsive to the search query when a portion of the search query matches portions of the document. For example, a document containing one or more words used in the search query may be responsive to the search query. The degree of responsiveness may be determined based on a combination of factors including the percentage of the document that matches the search query, the section of the document that matches the search query, the popularity of the document as measured by the number of links to the document, and other factors. For example, the degree of responsiveness may be higher when the search query matches the first paragraph or title of a document than when it matches only the middle section of a document.

The query-processing component 220 identifies documents that are responsive to the search query by analyzing descriptions of the documents found in one or more indexes. Examples of indexes that may be analyzed include the fresh index 250, the super-fresh index 252, and the main index 254. These indexes may be reverse lookup indexes and include similar information describing a plurality of documents. Typically, an entry for a document will include keywords from a document, a location where the document can be found, as well as other relevant information. The indexes may be built and edited by one or more crawlers associated with the search engine component 245. A crawler traverses a network and catalogs documents found on the network by placing them in one or more indexes such as the ones described previously.

The search engine component 245 builds one or more indexes, such as the fresh index 250, the super-fresh index 252, and the main index 254. The search engine component 245 may build these indexes by utilizing one or more crawlers that traverse one or more networks with various degrees of frequency.

Different indexes may serve different purposes within the search engine. The main index 254 indexes the largest number of documents. Because of the large number of documents in the main index 254, the documents within the index may be updated less frequently than the fresh index 250 and the super-fresh index 252. In addition, the main index 254 may have more information about links to documents and other information related to the relationships between documents.

The fresh index 250 includes descriptions of documents that have been published within a first threshold time from the present. For example, the fresh index 250 may include descriptions of documents published within the previous week. Some or even all of these documents could also be in the main index 254 or the super-fresh index 252. Index entries are removed from the fresh index 250 when they become older than the first threshold period of time. Thus, the fresh index 250 only describes documents published within the first threshold period of time.

The super-fresh index 252 includes descriptions of documents that have been published within a second threshold time from the present. The second threshold time is smaller than the first threshold time. For example, the super-fresh index 252 may include a description of documents published within the previous day. These documents could also be found in one of the other indexes. Index entries are removed from the super-fresh index 252 when they become older than the second threshold period of time. Thus, the super-fresh index 252 only describes documents published within the second threshold period of time.

The crawlers used to populate the fresh index 250 and the super-fresh index 252 may traverse a smaller area of the network than crawlers used to populate the main index 254. The crawlers working with the fresh index 250 and the super-fresh index 252 may focus on popular documents that are updated frequently, such as social networking sites and news sites. Web sites that frequently publish new documents may be visited frequently by web crawlers that populate the fresh index 250 and the super-fresh index 252.

The query-freshness component 230 determines whether the user that submits a search query wants to receive search results pointing to recently published documents. This determination is made by assigning a freshness score to a search query. The freshness score is calculated based on the number of responsive search results within the fresh index 250 or the fresh index 250 and the super-fresh index 252. In addition, the degree of responsiveness, or fit, with the documents in the fresh index 250 may be used when calculating the freshness score. In general, the more documents that are responsive to the query and the better fit between the search query and the documents within the fresh index 250, or the super-fresh index 252, the higher the freshness score. In this case, a higher freshness score indicates a high probability that the user submitting the search query seeks recently published documents. A low-freshness score indicates that the user is probably not interested in recently published documents. There is also a range between a high score and a low score where the user's intent may be ambiguous regarding whether or not they want to receive recently published documents.

In one embodiment, the freshness score calculated by the query-freshness component 230 is communicated to the query-processing component 220. The query-processing component 220 may then present different sets of search results based on the freshness score. In one embodiment, when the freshness score indicates that the user's intent to receive recently published documents is ambiguous, bifurcated search results are presented. A first group of search results are presented based solely on the document's responsiveness to the search query without significantly factoring in the documents' publication date. A second set of documents, which are limited to recently published documents, are presented with the first set of documents. The second set of search results may be separated from the first set and presented under a heading indicating the documents are recently published. The second group of search results may be drawn from responsive documents within the fresh index 250 or the super-fresh index 252. In general, the first set of documents may be drawn from the main index 254. A document qualifies as recently published when it is published within a designated time period.

The news-classifier component 240 may be used by the query-processing component 220 to determine whether the user is seeking news-related search results. In one embodiment, if the news-classifier component 240 determines that news search results are desired, the bifurcated search results described previously are not presented, even if the freshness score indicates that the user's intent to receive recent documents is ambiguous. In this embodiment, news results would be presented rather than typical search results. The query-processing component 220 may also access other classifiers (not shown) to help determine the types of search results that are most responsive to the search query.

Figure 3:
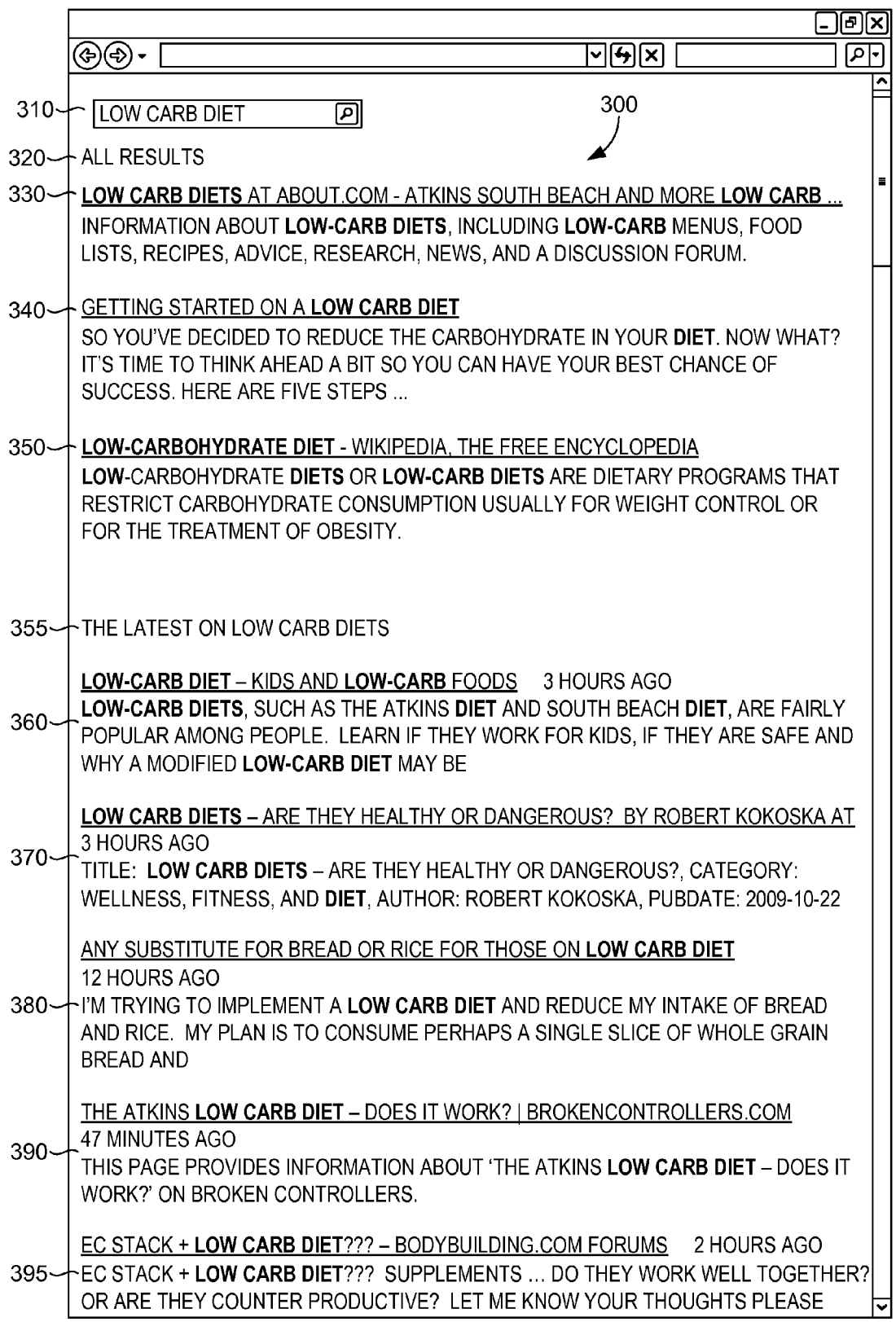
FIG. 3 is a diagram of a search results page displaying a fresh results section, in accordance with an embodiment of the present invention.

Turning now to FIG. 3, a search results page displaying a fresh results section is shown, in accordance with an embodiment of the present invention. The search results page 300 may be displayed by a web browser. In the example shown, a user has submitted a search query 310 "low carb diet." In response, two sets of results are shown. The main results section 320 and fresh-results section 355. The main section 320 shows search results that are selected based on a document's overall responsiveness to the search query 310. The main results section 320 includes search result 330, search result 340, and search result 350. Each of the search results describes a document related to low carb diets.

The fresh-results section 355 shows documents with a recent publication date. What is meant by "recent" may vary across different embodiments of the present invention. For example, recent documents could be published within the previous day, week, or even hours. In the embodiment shown, a publication date is shown with each of the search results in the fresh-results section 355. Search result 360 was published 3 hours ago. Search result 370 was published 3 hours ago. Search result 380 was published 12 hours ago. Search result 390 was published 47 minutes ago. Search result 395 was published 2 hours ago.

As can be seen, the search results in the fresh-results section 355 may not be ordered strictly based on their date of publication. Rather, in the example shown, the publication date acts as a filter. In other words, documents with a publication date beyond a threshold period are not eligible for inclusion in the fresh-results section 355. In one embodiment, recently published documents are ordered by responsiveness within the fresh-results section 355. As described previously, the fresh-results section 355 may be shown when the freshness intention of the search query 310 is ambiguous. Calculation or determination of the user's intention to receive fresh search results will be described in more detail subsequently.

Turning now to FIG. 4, a search result generated using a recent version of a document that is determined to be responsive to a search query based on an old version of the document is shown, in accordance with an embodiment of the present invention. Search result 410 and search result 420 illustrate how search result captions can change when the most recent version of a document is used to generate the caption. In this case, both search result 410 and 420 point to the same document. As can be seen, both versions of the document can be located on Wikipedia at the same URL 416 and 426. Search result 410 is generated based on an older version of the document. Search result 420 is generated based on an updated version of the document.

In one embodiment, upon determining that a document is responsive to the query based primarily on document information in a main index, a determination is made whether the document is also in a fresh index, such as fresh index 250. As described previously, the main index may contain more document information, but be updated less frequently. If the document is also in the fresh index, the fresh version of the document is used to build the caption. In this case, the document versions are similar enough that the title 412 and 422 of the respective search results are identical. However, the snippet 424 on search result 420 is different than the snippet 414 in search result 410. The snippet 424 associated with search result 420 shows that the Deepwater Horizon sank two days later. Search result 410 and 420 are shown for the sake of illustration. In one embodiment, both search results would not be shown as part of the same set of search results. Search result 420 illustrates an improvement to the user experience created by using newer document versions to generate search result captions.

Figure 5:
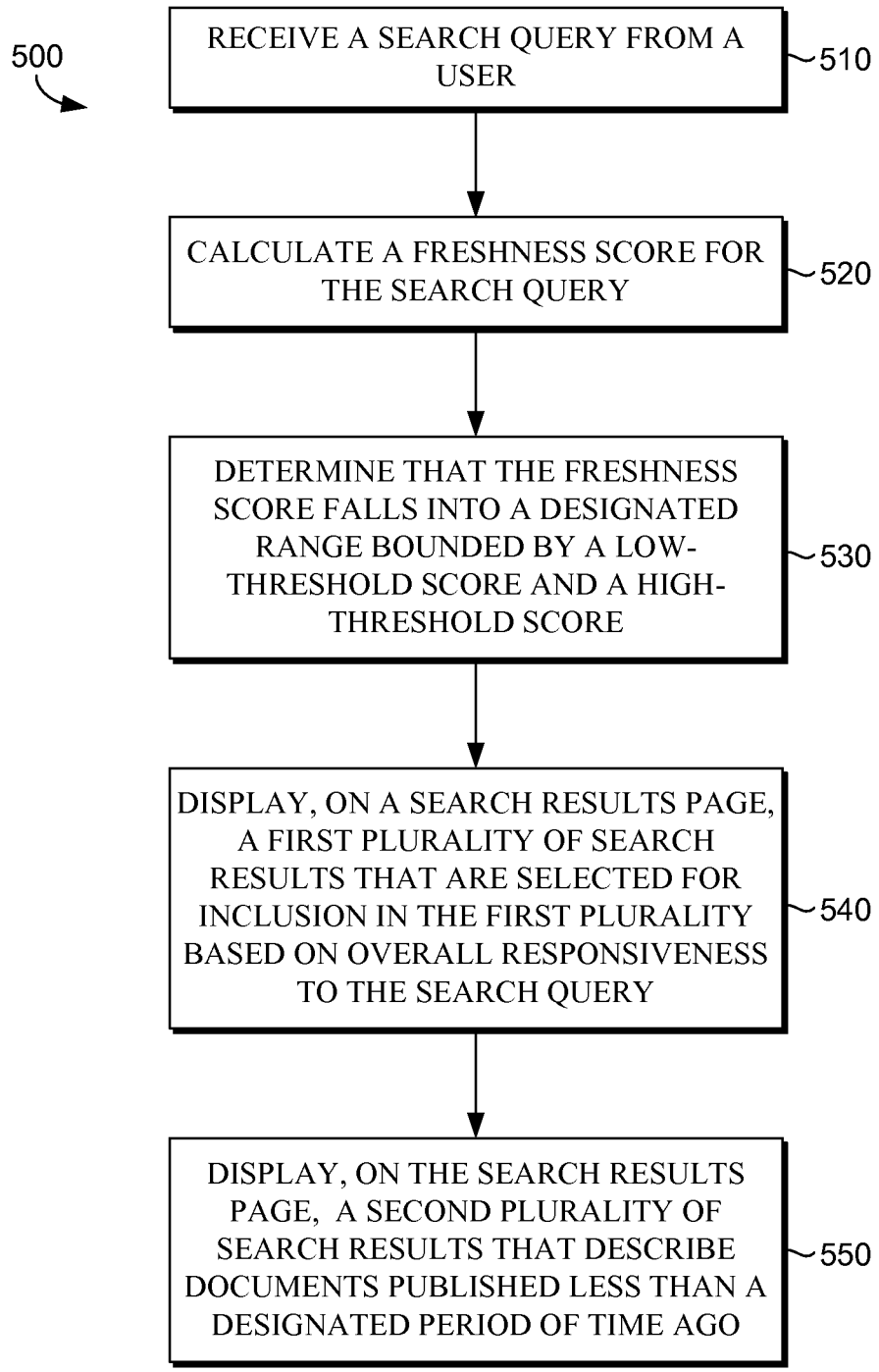
FIG. 5 is a flow chart showing a method of featuring recently published documents within search results, in accordance with an embodiment of the present invention.

Turning now to FIG. 5, a method 500 of featuring recently published documents within search results is shown, in accordance with an embodiment of the present invention. The search results may be presented by a search page presented on a webpage over the Internet. As described previously, a document may be a webpage, blog entry, image, spreadsheet, word processing document, book, or other similar object. A document is published when it is made available and may be accessed over a network.

At step 510, a search query is received from a user. The search query may be submitted through a website. The search query may include one or more words, numbers, or characters.

As step 520, a freshness score is calculated for the search query. The freshness score is based on how many recently published documents are responsive to the search query. Recently published documents may be indexed in a fresh index. The freshness score may be based on a percentage of recently published documents that match a query. The percentage of documents may be calculated by dividing an amount of recently published documents that match the query by an amount of recently published documents. To illustrate, on the day of the 2009 Presidential inauguration in the United States (Jan. 21, 2009), the query {Obama inaugural speech transcript} matched a large number of documents in the fresh index. Such a query would surpass the 'fresh' threshold. On the other hand, a query that same day on {first US president} would likely return no matches from the fresh index. Such a query would fall beyond the 'non-fresh' threshold. Finally, a query like {Obama} would have some matches in the fresh index and many matches in the main index. This query would have a freshness score between the two thresholds and thus, be deemed as having ambiguous intent.

As described previously, descriptions of recently published documents may be stored in a fresh index. Documents that are published more than a threshold period of time ago may be purged from a fresh index. Thus, the fresh index may contain only documents that are associated with documents published less than a designated period of time ago. For example, the freshness index may include documents that are associated with documents that are less than a week old. The freshness score may be based on more than just the number of recently published documents that match the search query. The quality of the match may also be taken into account. Thus, if the search query has a strong correlation, or match, with many documents that have been published recently then the freshness score would be higher than when there is a weak correlation between the same number of documents and a search query. Other factors, such as the portion of the document that matches the search query may be considered. For example, more weight may be given when the first paragraph or title of the document matches the search query.

At step 530, the freshness score is determined to fall into a designated range bounded by a low-threshold score and a high-threshold score. The designated range is selected to identify search queries with a freshness score that indicate an ambiguous intent to receive recently published documents. Search queries with a freshness score on one side of the range would be presumed to reflect a definite intent on the part of a user to receive recently published documents. For instance, on the day of the 2009 Presidential inauguration in the United States (Jan. 21, 2009), a query such as {Obama inaugural speech transcript} would have unambiguous fresh intent and thus require only fresh results. Search queries with a freshness score on the other end of the range are presumed to reflect a definite intent on the part of a user to not receive search results that focus on recently published documents. For instance, a query such as {first US president} is unlikely to have any fresh intent since this information hasn't changed for 200 years.

At step 540, a first plurality for search results are displayed on a search results page. The first plurality of search results are selected for inclusion based on overall responsiveness to the search query. The overall responsiveness may be determined by a standard algorithm used by the search engine to match search results with a search query. In one embodiment, the standard algorithm to measure responsiveness does not consider the publication date of a document. The first plurality of search results may be presented at the top of the search results page, as is shown in FIG. 3.

At step 550, a second plurality of search results are displayed on the search results page. The second plurality of the search results describe documents published less than a designated period of time ago. In one embodiment, the designated period of time is one week. The second plurality of search results are shown only upon determining the freshness score falls into a designated range that indicated ambiguous intent on the part of the user to receive recently published documents as search results. Other determinations may also be made before the second plurality of search results are displayed on the search results page. For example, a determination may be made that the user submitting the search query is not seeking news results. The search query may be analyzed by a news classifier to ascertain whether the user submitting the search query is seeking news results. In one embodiment, the second plurality of search results are described by a heading indicating that the second plurality of search results feature recently published documents. Such a heading is shown above the fresh-results section 355 in FIG. 3. The search results in the second plurality of documents or even the first plurality of documents may include an indication of the publication date of a document described by the search result.

Figure 6:
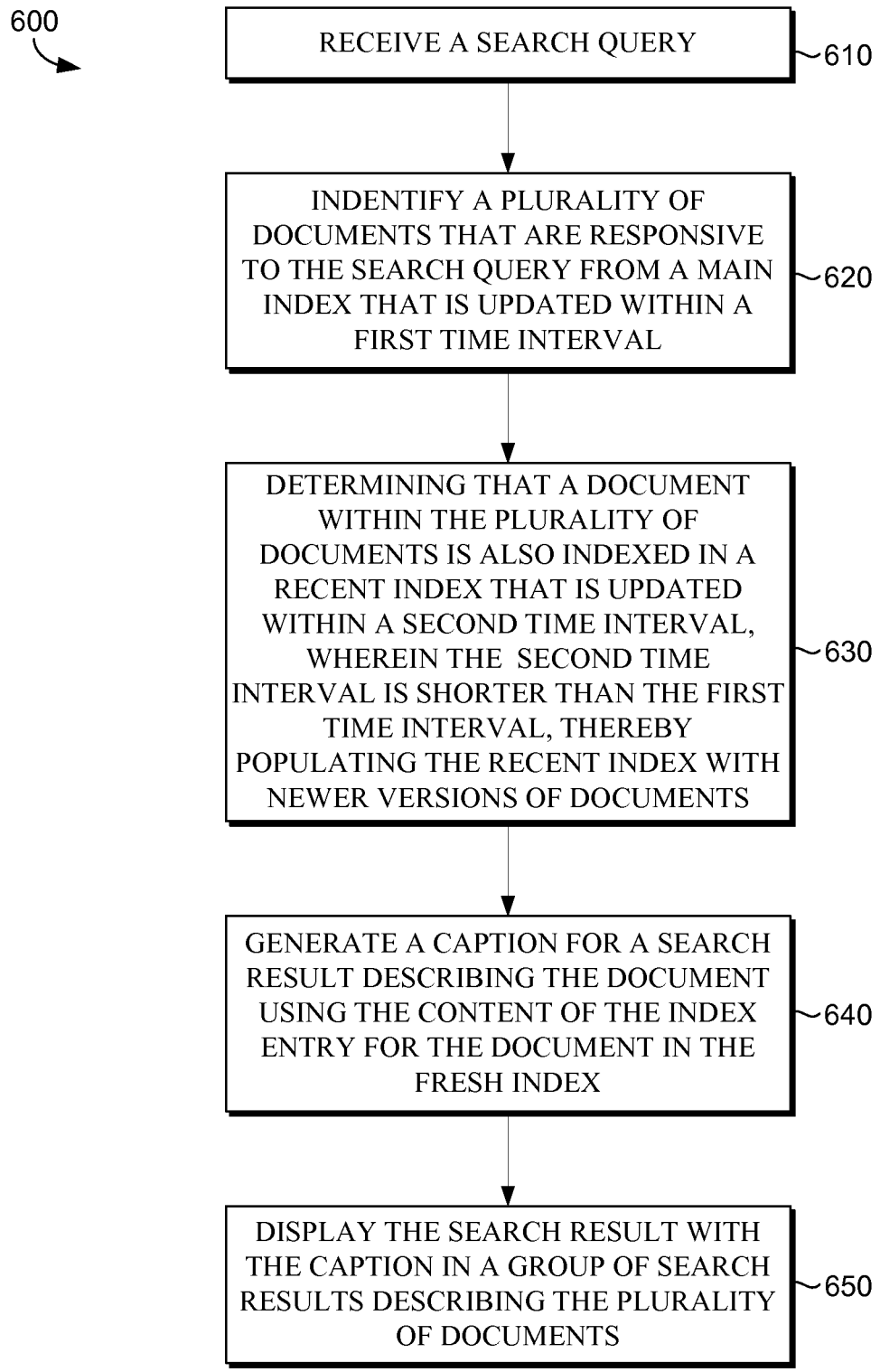
FIG. 6 is a flow chart showing a method of incorporating recent document changes into search result captions, in accordance with an embodiment of the present invention.

Turning now to FIG. 6, a method 600 of incorporating recent document changes into search result captions is shown, in accordance with an embodiment of the present invention. At step 610, a search query is received. At step 620, a plurality of documents that are responsive to the search query are identified. The documents are identified from a main index that is updated within a first time interval. For example the main index may be updated once a week. As described preciously, the main index may be built using one or more crawlers that identify documents published on a network, such as the Internet. The documents may be determined to be responsive to the search query using a standard algorithm.

At step 630, a document within the plurality of documents is determined to also be indexed in a recent index that is updated in a second interval of time. The second interval of time is shorter than the first interval of time. Accordingly, the documents in the recent index are likely to have been published more recently than the documents in the main index. At step 640, a caption for a search result describing the document is generated using the content of the index entry for the document in the fresh index. In other words, the documents responsiveness to the search query is determined using the main index and the caption for the document search result entry is generated using a different index, specifically the fresh index.

At step 650, the search result may be displayed with the caption generated based on the fresh index in a group of search results describing the plurality of documents. Using the information within the fresh index to build a caption may improve the freshness of the caption and make the search results more appealing. The main index may include a significantly larger number of documents than the recent index. Accordingly, the main index may be a better source to determine the overall responsiveness of a document, while the recent index includes text that improves the accuracy of the caption and makes the search result more appealing.

In one embodiment, the search results are built algorithmically based on keywords and text stored in an index entry describing the documents. The caption may include a title and a snippet taken from the document. The search result may also include a link to the document and a URL describing the documents location.

Figure 7:
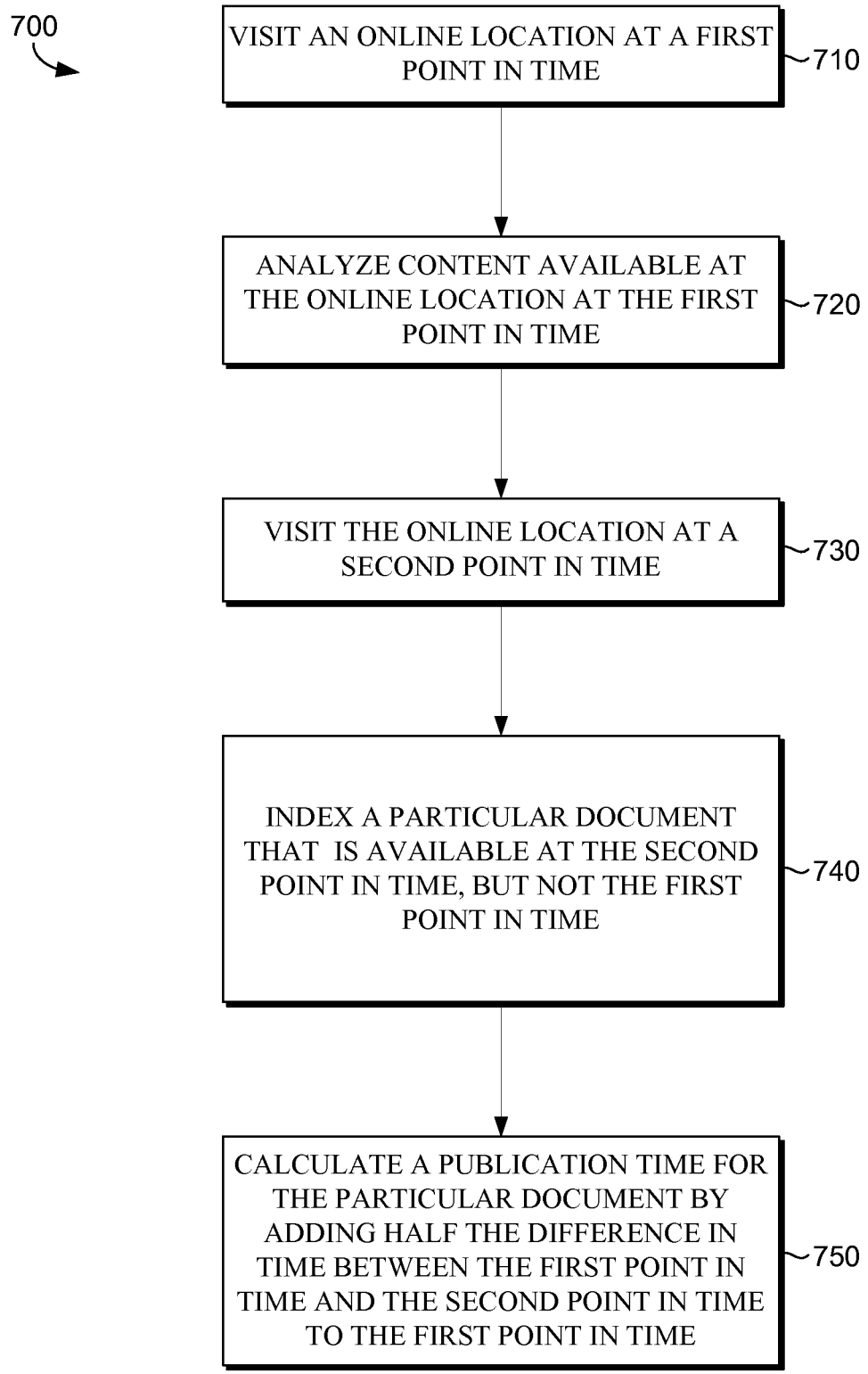
FIG. 7 is a flow chart showing a method of calculating a publication time for a document, in accordance with an embodiment of the present invention.

Turning now to FIG. 7, a method 700 of calculating a publication time for a document is shown, in accordance with an embodiment of the present invention. The publication time for a document describes approximately when the document was made available on a network such as the Internet. A document may be published, or made available, when a website is created, updated, when the document is included as part of an RSS feed, posted to a blog, or through other actions taken to make the document available.

At step 710, an online location is visited at a first point in time. The online location may be visited by a crawler that analyzes the online location for new content to index. At step 720, a content available at the online location is analyzed at the first point in time. One or more documents may be indexed if they are not presently indexed. The first point in time when the location is visited may be noted within the index. This allows the point in time at which the documents were first indexed to be retrieved at a later time.

At step 730, the online location is visited a second time at a second point in time. At step 740, a particular document that was not available at the first point of time but is available at the second point of time is indexed. This indicates that the document was published between the first point in time and the second point in time. The exact publication time is not known. At step 750, a published time for the particular document is calculated by adding half the difference in time between the first point and the second point in time to the first point in time. Thus, the published time is calculated to be the point in time directly between the first point in time and the second point in time. The published time is calculated without parsing or analyzing the document for text describing a publication date. The published time calculated through this method is an estimated publication time.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage memory devices having computer-executable instructions embodied thereon that when executed by a computing device, perform a method of featuring recently published documents within search results, the method comprising:

receiving a search query from a user;

identifying a first plurality of documents that are responsive to the search query because a portion of the search query matches one or more portions of the documents;

determining that an intent of the user to receive recently published documents is ambiguous by calculating a freshness score for the search query, wherein the freshness score is based on how many recently published documents are responsive to the search query, and by determining that the freshness score for the search query falls into a designated range bounded by a low-threshold score and a high-threshold score;

displaying, on a search results page, the first plurality of search results; and upon said determining, that the freshness score for the search query falls into a designated range bounded by the low-threshold score and the high-threshold score, displaying, on the search results page with the first plurality of search results, a second plurality of search results that describe documents published less than a designated period of time from the present.

2. The memory device of claim 1, wherein said determining also comprises determining that the search query is not a news query by analyzing the search query with a news classifier.

3. The memory device of claim 1, wherein the method further comprises displaying a heading between the first plurality of search results and the second plurality of search results that describes the second plurality of search results as presenting recently published documents.

4. The memory device of claim 1, wherein the documents are webpages.

5. The memory device of claim 1, wherein the calculating is based on an amount of high-quality matches with documents that are indexed within a recent document index, wherein the recent document index includes documents that have been published within the designated period of time.

6. The memory device of claim 1, wherein the method further comprises displaying a publication time with one or more of the search results within the second plurality of search results, and wherein the publication time indicates when a document described by a search result was published.

7. The memory device of claim 6, wherein the method further comprises calculating the publication time for the document based on when the document was first indexed by a search engine and a previous time the document's location was visited by the search engine, and wherein the document was not available at the previous time.

8. The memory device of claim 7, wherein the publication time is calculated without parsing the document for text indicating when the document was published.

9. A method of including recent document changes in search result captions, the method comprising:

receiving a search query;

identifying a first plurality of documents that are responsive to the search query because a portion of the search query matches one or more portions of the documents;

calculating a freshness score for the search query, wherein the calculating is based on an amount of high-quality matches with documents that are indexed within a fresh index;

determining that the freshness score falls into a designated range bounded by a low-threshold score and a high-threshold score, wherein the designated range is set to include scores that indicate an ambiguous intention of the user to receive recently published documents;

using information describing the documents, storing the first plurality of documents in a main index that is updated within a first time interval;

determining that a document within the first plurality of documents stored in the main index, is also indexed in the fresh index that is updated within a second time interval, wherein the second time interval is shorter than the first time interval, thereby populating the fresh index with newer versions of documents;

generating a search result caption, for the document stored in the main index and the fresh index, that describes the document using content from the document's index entry within the fresh index; and upon said determining that the freshness score falls within the designated range, displaying, the search result caption for the document stored in the main index and the fresh index, within a group of search result captions, wherein each search result caption in the group of search result captions describes a respective document in the first plurality of documents.

10. The method of claim 9, wherein the search result caption includes a title and a snippet built suing text taken from and stored in an index entry that describes the document.

11. The method of claim 9, wherein the search result caption includes a publication time for the document described by the search result caption, and wherein the method further comprises:

visiting an online location at a first point in time;

analyzing a content available at the online location at the first point in time;

visiting the online location at a second point in time;

indexing the document, which was available at the second point in time, but not the first point in time; and calculating the publication time for the document by adding half a difference in time between the first point in time and the second point in time to the first point in time.

12. The method of claim 11, wherein said calculating the publication time is completed without parsing the document to identify a stated publication time for the document.

13. The method of claim 9, further comprising determining that content of an index entry for the document in the main index is different than content of an index entry for the document in the fresh index.

14. The method of claim 9, wherein the determining further comprises determining that the search query is not a news query by analyzing the search query with a news classifier.

15. The method of claim 9, wherein the document is one or more of a webpage, a blog entry, a microblog entry, and a social media page.

16. The method of claim 9, further comprising displaying a publication time with the search result caption for the document stored in the fresh index.

17. A computer system for executing a computerized method for featuring recently published documents within a search results page, the system comprising:

a user interface component that generates a user interface for display on the user's computing device and that receives a search query from the user through the user interface;

a query-processing component that identifies a first plurality of documents that are responsive to the search query because a portion of the search query matches one or more portions of the first plurality of documents, wherein when an intent of the user is determined to be ambiguous, it is configured to display, on the user interface, the first plurality of documents with a second plurality of search results that describe documents published less than a designated period of time from the present; and a query freshness component that determines whether the intent of the user to receive recently published documents is ambiguous by calculating the freshness score for the search query and by determining that the freshness score for the search query falls into a designated range bounded by a low-threshold score and a high-threshold score, wherein the freshness score is based on how many recently published documents are responsive to the search query.

18. The system of claim 17, wherein the query-processing component determining further comprises a news-classifier component.

19. The system of claim 17, wherein at least the first plurality documents are one or more of a webpage, a blog entry, a microblog entry, and a social media page.

20. The system of claim 17, further comprising one or more crawlers for building at least a main index of documents.

* * * * *